March 2, 1943.  H. J. ANDREW  2,312,376
GEARING
Filed May 25, 1942

Inventor
H. J. Andrew
By Glascock Downings Leibold
Attys

Patented Mar. 2, 1943

2,312,376

UNITED STATES PATENT OFFICE 2,312,376

GEARING

Harry Jones Andrew, Oldham, England

Application May 25, 1942, Serial No. 444,451
In Great Britain June 16, 1941

1 Claim. (Cl. 74—306)

This invention relates to an improvement in or modification of mechanism in or for insertion in the drive to a tapping or screwing tool for the machine tapping of screw threads for converting a constant drive into a periodically self-reversing drive, according to U. S. Patent 2,296,892.

According to the present invention the rotary frame carrying the epicyclic gearing is in the form of a hollow pulley or gear wheel, which takes the drive and runs on a fixed shaft, to which shaft the sun wheel of the epicyclic gear is secured, the final member of the epicyclic train being secured to a hollow shaft which runs on the fixed shaft and drives the tapping or screwing tool.

The arrangement according to the invention is illustrated by way of example in the accompanying drawing, in which—

Figure 1:
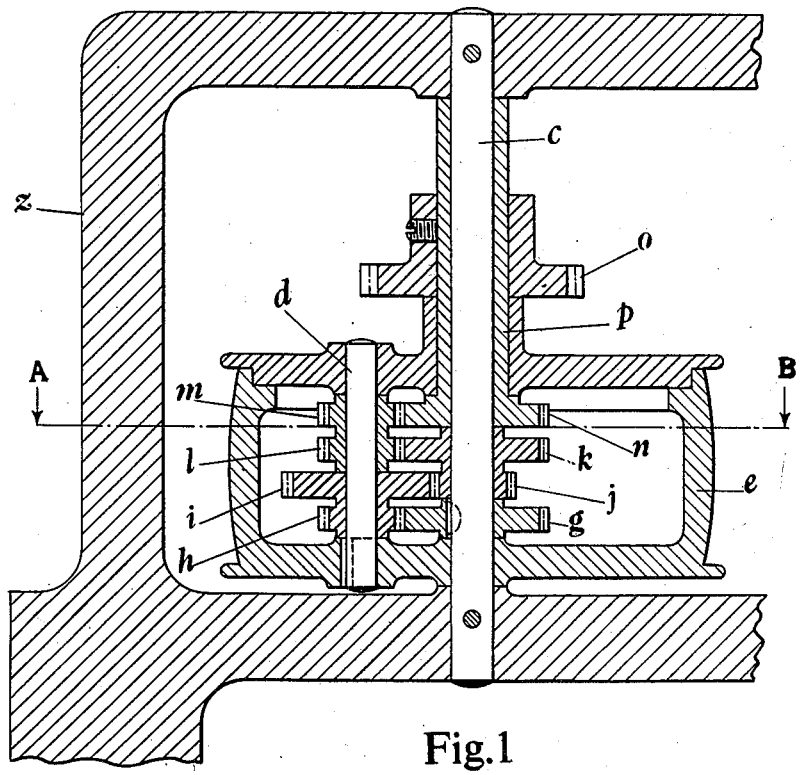
Figure 1 is a sectional elevation.
Figure 2:
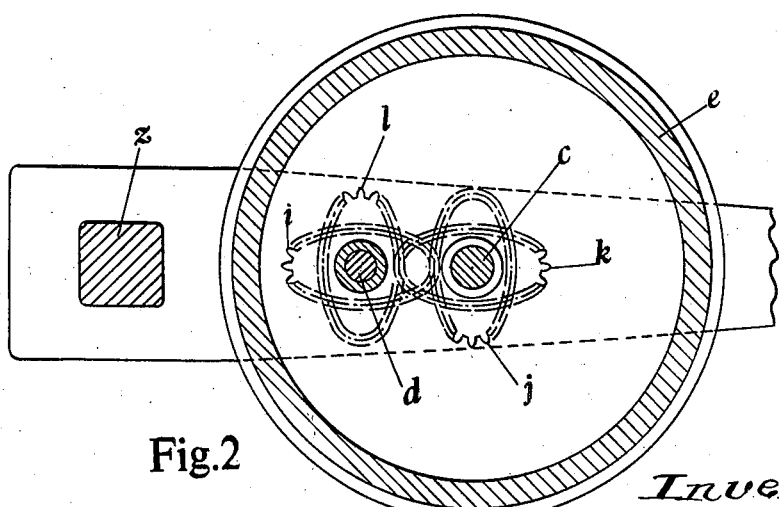
Figure 2 is a sectional plan view on the line A—B of Figure 1.

The drive for the tapping tool is taken by a hollow pulley $e$ mounted on a fixed shaft $c$ carried by the stationary frame $z$ of the appliance. The pulley $e$ carries the spindle $d$ for the planet wheels $h$, $i$, $l$ and $m$ of the epicyclic gear. These planet wheels form two double wheels, $h$, $i$ and $l$, $m$, which are loose on the spindle $d$. The wheel $h$ meshes with the sun wheel $g$ which is fast on the fixed shaft $c$, the wheels $i$ and $l$ mesh with the wheels $j$ and $k$ which form a double wheel loose on the shaft $c$, and the wheel $m$ meshes with the final member of the epicyclic train, the wheel $n$, which is secured to a hollow shaft $p$ running on the shaft $c$ and having secured to it a gear wheel $o$ for driving the tapping tool holder through suitable gearing.

The pairs of the wheels $h$—$g$, $i$—$j$, and $l$—$k$ are elliptical gears, and the pair of wheels $m$—$n$ are circular gears. As a result of this arrangement, the wheel $o$ which drives the tapping tool holder will periodically reverse its direction of rotation. The length of time during which it is rotating in either direction will depend on the gears of the epicyclic train. It could conveniently be arranged to reverse twice in each revolution for approximately 45° each time.

The hollow pulley $e$ could be replaced by a gear wheel, and the wheel $o$ could be replaced by a pulley if desired.

What I claim is:

In a driving mechanism for a tapping or screwing tool for the machine tapping of screw threads, in combination, a fixed spindle, a driven wheel or pulley revolving about said spindle, a second spindle mounted in said wheel or pulley parallel to said first spindle so that it revolves around it, an elliptical gear wheel secured upon the first spindle, a first pair of elliptical gear wheels revolving freely upon the second spindle, one of which meshes with the aforesaid elliptical gear wheel, a pair of elliptical gear wheels revolving freely upon the first spindle, one of which meshes with the other of the pair of elliptical gear wheels upon the second spindle, a second pair of wheels, one circular and one elliptical, revolving freely upon the second spindle, the elliptical wheel meshing with the second of the pair of elliptical wheels upon the first spindle, a single circular wheel revolving freely upon said first spindle and meshing with the circular wheel of the pair upon the second spindle, all the aforesaid wheels being within the wheel or pulley, and a circular wheel external to the wheel or pulley for driving the tapping or screwing tool secured upon a sleeve-like extension of the said single circular wheel.

HARRY JONES ANDREW.